United States Patent
Abe et al.

(10) Patent No.: US 7,605,051 B2
(45) Date of Patent: Oct. 20, 2009

(54) METHOD FOR FORMING INTERNAL ELECTRODE PATTERN AND METHOD FOR MANUFACTURING MULTILAYER CERAMIC ELECTRONIC COMPONENT USING SAME

(75) Inventors: Fuyuki Abe, Kyoto (JP); Shinya Okumura, Osaka (JP); Takahiko Tsujimura, Kyoto (JP); Kengo Nakamura, Hyogo (JP); Atsuo Nagai, Osaka (JP)

(73) Assignee: Panasonic Corporation, Osaka (JP)

( * ) Notice: Subject to any disclaimer, the term of this patent is extended or adjusted under 35 U.S.C. 154(b) by 316 days.

(21) Appl. No.: 11/794,945

(22) PCT Filed: Mar. 22, 2006

(86) PCT No.: PCT/JP2006/005683

§ 371 (c)(1),
(2), (4) Date: Jul. 10, 2007

(87) PCT Pub. No.: WO2006/109466

PCT Pub. Date: Oct. 19, 2006

(65) Prior Publication Data

US 2008/0127469 A1    Jun. 5, 2008

(30) Foreign Application Priority Data

Mar. 30, 2005    (JP)    ............................. 2005-097408

(51) Int. Cl.
*H01L 21/46*    (2006.01)

(52) U.S. Cl. ................... 438/455; 438/458; 438/464; 438/759; 257/E21.088; 257/E21.506; 257/E21.519

(58) Field of Classification Search ............... 438/23, 438/63, 759; 257/E21.087, E21.48, E21.512, 257/E21.513
See application file for complete search history.

(56) References Cited

U.S. PATENT DOCUMENTS 6,074,893 A * 6/2000 Nakata et al. ............... 438/106

2005/0158895 A1 * 7/2005 Hayashi et al. ............... 438/22

FOREIGN PATENT DOCUMENTS

| JP | 63-38285 | 2/1988 |
| JP | 02-058814 | 2/1990 |
| JP | 02-192707 | 7/1990 |
| JP | 06-061090 | 3/1994 |
| JP | 6-061090 A | 3/1994 |
| JP | 7-79189 B | 8/1995 |
| JP | 2004-111729 | 4/2004 |
| KR | 2002-0077588 A | 10/2002 |

OTHER PUBLICATIONS

Korean Office Action issued in Korean Patent Application No. KR 10-2007-7014868 dated Nov. 13, 2008.
Korean Office Action issued in Korean Patent Application No. KR 10-2007-7014868 dated Apr. 20, 2009.

* cited by examiner

*Primary Examiner*—Savitri Mulpuri
*Assistant Examiner*—Cheung Lee
(74) *Attorney, Agent, or Firm*—McDermott Will & Emery LLP

(57) ABSTRACT

A method for forming an internal electrode pattern having a predetermined shape includes the following: a step of forming a conductive layer by applying a metal paste on a first support, the metal paste containing metal powder and a binder; a step of forming a resin layer on a second support, the resin layer having a pattern negative to the internal electrode pattern; a step of compression bonding the first support and the second support to each other in such a manner that the conductive layer and the resin layer are opposite to each other; and a step of removing the second support from the first support so as to transfer a conductive layer to the second support, the conductive layer having the pattern negative to the internal electrode pattern, thereby forming the internal electrode pattern having the predetermined shape on the first support.

2 Claims, 3 Drawing Sheets

METHOD FOR FORMING INTERNAL ELECTRODE PATTERN AND METHOD FOR MANUFACTURING MULTILAYER CERAMIC ELECTRONIC COMPONENT USING SAME

RELATED APPLICATIONS

This application is the U.S. National Phase under 35 U.S.C. 371 of international Application No. PCT/JP2006/305683, filed on Mar. 22, 2006, which in turn claims the benefit of Japanese Application No. 2005-097408, filed on Mar. 30, 2005, the disclosures of which Applications are incorporated by reference herein.

TECHNICAL FIELD

The present invention relates a method for forming an internal electrode pattern used in a multilayer ceramic electronic component such as a multilayer ceramic capacitor, and a method for fabricating a multilayer ceramic electronic component using the method for forming an internal electrode pattern.

BACKGROUND ART

Conventionally, an internal electrode pattern used in a multilayer ceramic capacitor, which is a typical multilayer ceramic electronic component, is made of a metal paste by using a printing method such as screen printing or gravure printing. For example, Japanese Patent Unexamined Publication No. H02-192707 shows a method for forming an internal electrode pattern by screen printing. Japanese Patent Unexamined Publication No. 2004-111729 shows a method for forming an internal electrode pattern by gravure printing.

Particularly in recent years, multilayer ceramic capacitors have been required to have a smaller size and a higher capacitance. In order to make the multilayer ceramic capacitors have a higher capacitance, the ceramic layers and the internal electrode layers need to have a smaller thickness and be laminated in a larger number. However, the aforementioned printing methods often cause the printed internal electrode pattern to have a rough surface. When the internal electrode pattern is formed thin, the roughness of its surface causes the internal electrode layer to be discontinuous, so that the internal electrodes are isolated from each other, making it impossible to obtain a desired capacitance. Thus, it is difficult to reduce the thickness of the internal electrode layer.

SUMMARY OF THE INVENTION

The present invention is directed to provide a method for forming an internal electrode pattern having a predetermined shape includes the following: a step of forming a conductive layer by applying a metal paste on a first support, the metal paste containing metal powder and a binder; a step of forming a resin layer on a second support, the resin layer having a pattern negative to the internal electrode pattern; a step of compression bonding the first support and the second support to each other in such a manner that the conductive layer and the resin layer are opposite to each other; and a step of removing the second support from the first support so as to transfer a conductive layer to the second support, the conductive layer having the pattern negative to the internal electrode pattern, thereby forming the internal electrode pattern having the predetermined shape on the first support.

According to this method, an internal electrode pattern that is extremely flat with little variation in thickness can be formed in a desired shape with high precision.

The present invention is also directed to provide a method for fabricating a multilayer ceramic component by alternately laminating a plurality of ceramic sheets and a plurality of the internal electrode patterns that are formed by the method for forming an internal electrode pattern of the present invention. The method for fabricating a multilayer ceramic component includes the following: a step of forming each of the ceramic sheets on a film, the ceramic sheets containing ceramic powder and a binder; a step of forming each of the internal electrode patterns on a support by using the method of forming an internal electrode pattern of the present invention; a step of forming a laminated body by alternately laminating a plurality of the supports having the internal electrode patterns thereon and a plurality of the films having the ceramic sheets thereon; and a step of sintering the laminated body.

This method achieves an internal electrode pattern that is extremely flat with little variation in thickness. This prevents the internal electrodes from physically entering the ceramic sheets, thereby eliminating the occurrence of short circuit failure. Furthermore, the internal electrode layer becomes continuous when sintered, preventing the internal electrodes from being isolated from each other. As a result, excellent quality electronic components are produced at a high yield.

Figure 1:
FIG. 1 is a sectional view of a ceramic sheet formed on a film according to an embodiment of the present invention.

REFERENCE MARKS IN THE DRAWINGS 10 film
11 ceramic sheet
12 conductive layer
121 conductive layer having a negative pattern
13 resin layer
14 internal electrode pattern
15 laminated body
20 first support
30 second support

DETAILED DESCRIPTION OF PREFERRED EMBODIMENT

The following is a description of a method for forming an internal electrode pattern and a method for fabricating a multilayer ceramic electronic component using the method for forming an internal electrode pattern according to an embodiment of the present invention. In the following description, a multilayer ceramic capacitor is taken up as an example of the multilayer ceramic electronic component, and a method for fabricating it is detailed with reference to drawings.

EMBODIMENT

A method for fabricating a multilayer ceramic capacitor according to an embodiment of the present invention is described as follows with reference to FIG. 7.

First of all, ceramic powder is prepared by mixing barium titanate-based ceramic raw powder with one or more additives such as a rare-earth element oxide, $SiO_2$, MgO, and $MnO_2$, and by subjecting the mixture to calcination and pulverization if necessary.

This ceramic powder is formed into a ceramic slurry by being mixed with a binder such as polyvinyl butyral resin or acrylic resin, a plasticizer such as phthalate ester, and a solvent such as butyl acetate.

The ceramic slurry is applied on film 10 made of a material such as polyethylene terephthalate (hereinafter abbreviated as PET) by a doctor blade or the like and dried to form ceramic sheet 11 as shown in FIG. 1 (S10). Ceramic sheet 11 is 3.0 µm thick at this moment. Ceramic sheet 11 loses organic substances contained therein when sintered, and becomes a dielectric layer of the multilayer ceramic capacitor.

The following is a description of a step of forming internal electrode pattern 14 (S20).

Figure 2:
FIG. 2 is a sectional view of a conductive layer formed on a first support according to the embodiment of the present invention.

First of all, a nickel paste is prepared by mixing metallic nickel powder as a main component, a binder such as polyvinyl butyral resin or acrylic resin, a plasticizer such as phthalate ester, and a solvent such as butyl acetate. This nickel paste is applied by a die coater on first support 20 such as a PET film or the like and dried to form conductive layer 12 as shown in FIG. 2. Conductive layer 12 is 1.5 µm thick at this moment (first step S21).

Figure 3:
FIG. 3 is a sectional view of a resin layer formed on a second support according to the embodiment of the present invention.

On the other hand, a resin paste containing polyvinyl butyral resin, a plasticizer, and the like is prepared. The resin paste is applied on second support 30 such as a PET film by gravure printing or the like so as to be formed into resin layer 13 having a pattern corresponding to the internal-electrode non-formation portion as shown in FIG. 3 (second step S22). The pattern corresponding to the internal-electrode non-formation portion means the pattern negative to the internal electrode pattern having a predetermined shape, and hereinafter referred to as a negative pattern portion.

Next, first support 20 and second support 30 are laminated in such a manner that conductive layer 12 and resin layer 13 are opposite to each other, and then pressure-bonded to each other (third step S23). The pressure-bonded state is shown in the left half of FIG. 4.

Figure 4:
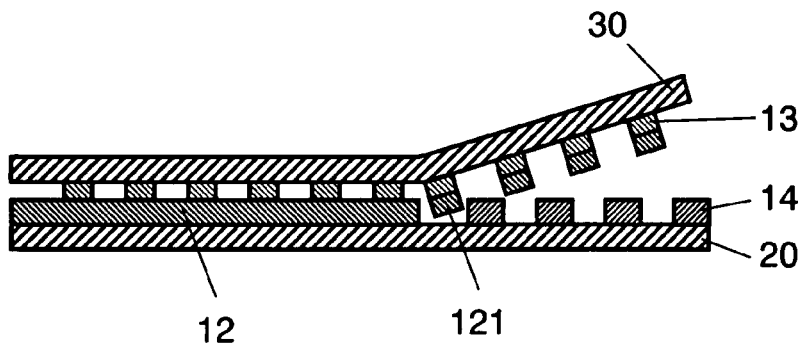
FIG. 4 is a sectional view showing a method for forming an internal electrode pattern according to the embodiment of the present invention.
Figure 5:
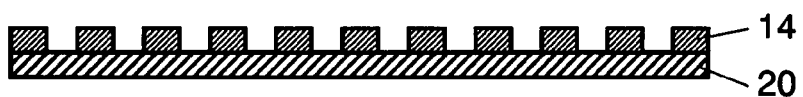
FIG. 5 is a sectional view of the internal electrode pattern formed on the first support according to the embodiment of the present invention.

Later, as shown FIG. 4, second support 30 is removed from first support 20. In this removal, conductive layer 121, which is in the internal-electrode non-formation portion (negative pattern portion) bonded to resin layer 13, is removed together with second support 30 (fourth step S24). As a result, internal electrode pattern 14, which has not been bonded to resin layer 13, is left on first support 20 (FIG. 5). In other words, conductive layer 121 having the pattern negative to internal electrode pattern 14 is removed from first support 20 and transferred on second support 30.

When sintered, internal electrode pattern 14 becomes the internal electrode of the multilayer ceramic capacitor.

The removal of conductive layer 121 in the negative pattern portion is described as follows. In the embodiment, conductive layer 12 is formed of a composition of metallic nickel powder and binder resin. This means that conductive layer 12 has a lower bonding strength between the metal powder particles than a metal thin film formed by deposition or the like, so that conductive layer 121 in the negative pattern portion can be removed easily. When observed after the removal of the negative pattern portion, internal electrode pattern 14 is left in a precise pattern shape, without any part of it being transferred together with conductive layer 121. The thickness of internal electrode pattern 14 is measured using a surface roughness tester and found to be within a range of 1.5±0.02 µm, indicating that the obtained internal electrode pattern is extremely flat.

Figure 6:
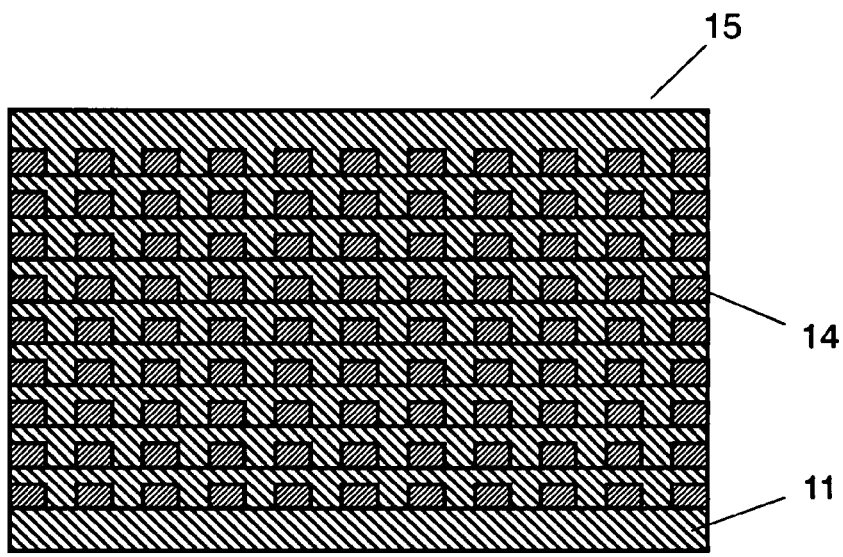
FIG. 6 is a sectional view of a laminated body according to the embodiment of the present invention.

In the embodiment, a plurality of ceramic sheets 11 and a plurality of internal electrode patterns 14 formed as described above are alternately laminated to form laminated body 15 having 300 layers of internal electrode patterns 14 (laminated body forming step S30). Note that FIG. 6 shows only nine layers of internal electrode patterns 14 for easier explanation.

The laminated body is cut into individual pieces of a predetermined size in such a manner that each piece has a size of 3.2 mm×1.6 mm when sintered, and then each piece is sintered to form a sintered body (sintering step S40).

Each sintered body is provided with an external electrode on each end surface thereof where some internal electrodes are exposed. As a result, the multilayer ceramic capacitor of the embodiment is complete.

On the other hand, an internal electrode pattern of Comparative Example is formed on a PET film by screen printing. The internal electrode pattern is made of a metallic nickel powder-based nickel paste having a pattern similar to that used in the embodiment. The thickness of the internal electrode pattern is also measured by a surface roughness tester and found to be in a range of 1.5±0.14 µm.

The measurement results show that the internal electrode pattern formed in accordance with the method of the embodiment is flatter with less variation in thickness than the internal electrode pattern formed in accordance with the conventional method.

A plurality of internal electrode patterns of Comparative Example and a plurality of ceramic sheets 11 are alternately laminated to form a laminated body having 300 layers of internal electrode patterns 14. The laminated body is cut into pieces and sintered to form sintered bodies each having a size of 3.2 mm×1.6 mm. Each sintered body is provided with an external electrode on each end surface thereof where some internal electrodes are exposed. As a result, the multilayer ceramic capacitor of Comparative Example is complete.

The multilayer ceramic capacitor of the embodiment and the multilayer ceramic capacitor of Comparative Example are checked to evaluate variation in electrostatic capacitance and the rate of short circuit failure.

To evaluate the rate of short circuit failure, the resistance values of 200 samples are measured using an insulation resistance-tester, and the number of samples having a resistance value of $10^3$ Ω or less is expressed in a percentage that indicates the rate of short circuit failure.

To evaluate the variation in electrostatic capacitance, 100 samples excluding those with a short circuit failure are placed in a constant temperature bath of 20° C. Then, the difference "R" between the maximum and minimum values at a frequency of 1 kHz and an input signal level of 1.0 Vrms is defined as the variation in electrostatic capacitance.

The evaluation results of the variation in electrostatic capacitance and the rate of short circuit failure of the multilayer ceramic capacitors of the embodiment and of Comparative Example are shown in Table 1 below together with the measured thickness of the internal electrode patterns.

TABLE 1

| Samples | Thickness of internal electrode pattern (μm) | Electrostatic capacitance (μF) average value | Electrostatic capacitance (μF) variation "R" | Rate of short circuit failure (%) |
|---|---|---|---|---|
| Embodiment | 1.5 ± 0.02 | 11.5 | 0.2 | 0 |
| Comparative Example | 1.5 ± 0.14 | 10.4 | 1.4 | 12 |

As apparent from Table 1, in the multilayer ceramic capacitor of Comparative Example, the variation "R" in electrostatic capacitance is as large as 1.4 μF and the rate of short circuit failure is as high as 12%. In the multilayer ceramic capacitor of the embodiment, on the other hand, the variation "R" in electrostatic capacitance is as small as 0.2 μF and the rate of short circuit failure is 0%, indicating that excellent quality products are produced at a high yield.

The internal electrode pattern of the multilayer ceramic capacitor of Comparative Example has a rough surface with large variation in thickness because it is formed by the conventional screen printing. The rough surface causes the internal electrodes to physically enter the ceramic sheets, thereby causing short circuit failure. In addition, it is likely that the rough surface also causes the internal electrode layer to be discontinuous when sintered, so that the internal electrodes are isolated from each other. This makes it impossible to obtain a desired capacitance, thereby increasing the variation in electrostatic capacitance.

In the multilayer ceramic capacitor of the embodiment, on the other hand, conductive layer 121 in the negative pattern portion of conductive layer 12 on first support 20 is removed together with resin layer 13 formed on second support 30. As a result, internal electrode pattern 14, which can be extremely flat with little variation in thickness, is formed on first support 20. This prevents the internal electrodes from physically entering the ceramic sheets, thereby eliminating the occurrence of short circuit failure. Even when the internal electrode pattern is formed as thin as in Comparative Example, the internal electrode layer becomes continuous when sintered, preventing the internal electrodes from being isolated from each other, thereby obtaining a desired capacitance.

In the embodiment, the conductive layer to form the internal electrode pattern is made of a metallic nickel powder-based nickel paste. Alternatively, the paste may be made of other metals such as silver, copper, palladium, or platinum.

In the embodiment, the multilayer ceramic capacitor is taken up as an example of the multilayer ceramic electronic component; however the same effects can be obtained in the fabrication of other multilayer ceramic electronic components such as multilayer thermistors, multilayer varistors, and multilayer inductors.

Figure 7:
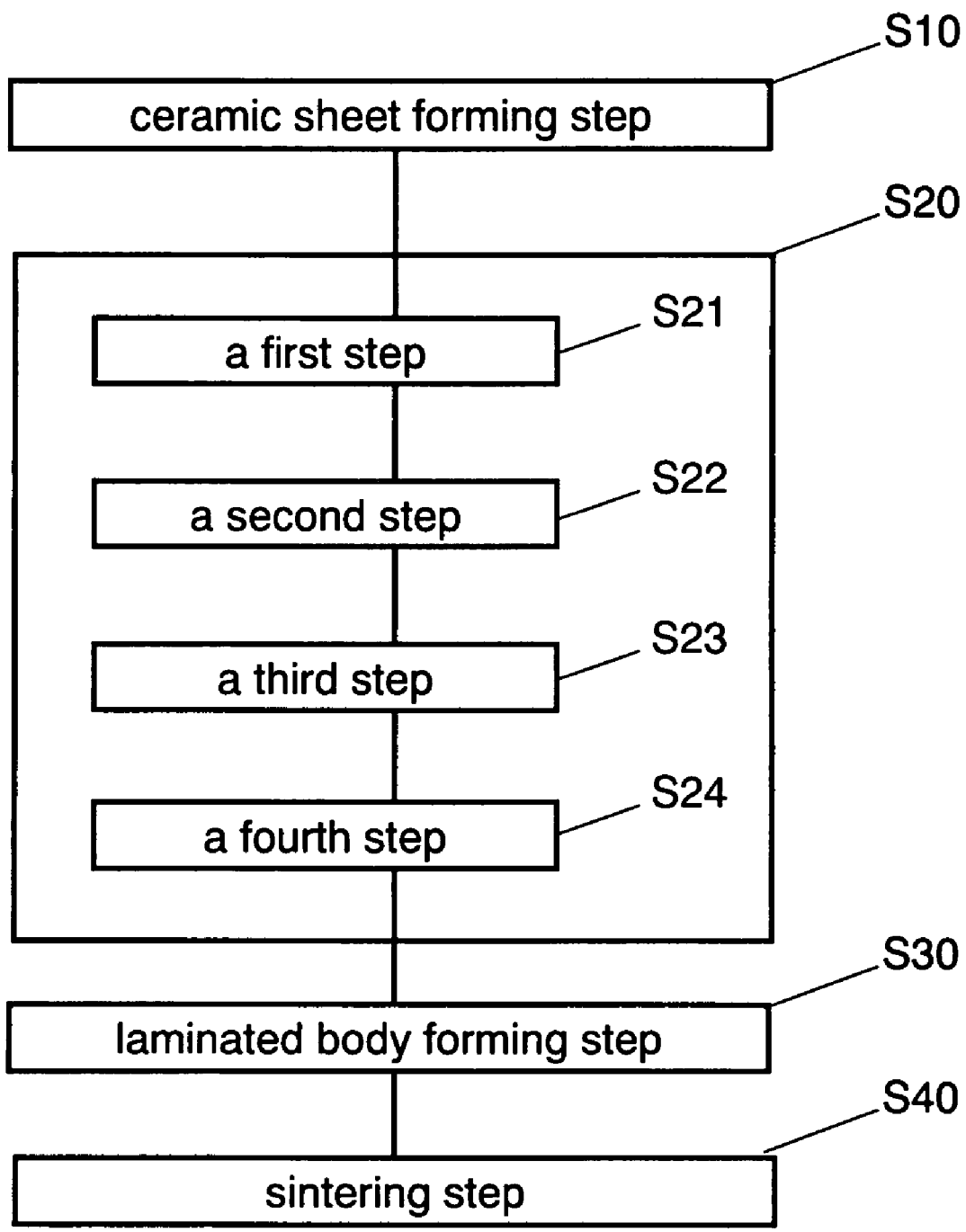
FIG. 7 is a flowchart showing a method for fabricating a ceramic component according to the embodiment of the present invention.

Note that the flowchart of FIG. 7 does not show the steps in chronological order. It is inevitable to perform fourth step S24 involving the removal after third step S23 involving the pressure bonding, and to perform sintering step S40 after laminated body forming step S30. On the other hand, it is possible to interchange between first step S21 and second step S22, or between ceramic sheet forming step S10 and internal electrode forming step S20.

According to the method for forming an internal electrode pattern of the present invention, an internal electrode pattern that is extremely flat with little variation in thickness can be formed in a desired shape with high precision. According to the method for fabricating a multilayer ceramic electronic component of the present invention, an internal electrode pattern can be extremely flat with little variation in thickness. This prevents the electrode materials from physically entering the ceramic sheets, thereby eliminating the occurrence of short circuit failure. Even when the internal electrode pattern is formed thin, the internal electrode layer becomes continuous when sintered, thereby preventing the internal electrodes from being isolated from each other. As a result, excellent quality products are produced at a high yield.

INDUSTRIAL APPLICABILITY

The method for forming an internal electrode pattern, and the method for fabricating a multilayer ceramic electronic component according to the present invention are useful for the fabrication of a multilayer ceramic electronic component that is required to have a smaller thickness and be laminated in a larger number.

The invention claimed is:

1. A method for forming an internal electrode pattern having a predetermined shape, the method comprising:
    a first step of forming a conductive layer by applying a metal paste on a first support, the metal paste containing metal powder and a binder;
    a second step of forming a resin layer on a second support, the resin layer having a pattern negative to the internal electrode pattern;
    a third step of compression bonding the first support and the second support to each other in such a manner that the conductive layer and the resin layer are opposite to each other; and
    a fourth step of removing the second support from the first support so as to transfer a conductive layer to the second support, the conductive layer having the pattern negative to the internal electrode pattern, thereby forming the internal electrode pattern having the predetermined shape on the first support.

2. A method for fabricating a multilayer ceramic component having a plurality of ceramic sheets and a plurality of internal electrode patterns alternately laminated to each other, the method comprising:
    a step of forming each of the internal electrode patterns by a method comprising:
        a first step of forming a conductive layer by applying a metal paste on a first support, the metal paste containing metal powder and a binder;
        a second step of forming a resin layer on a second support, the resin layer having a pattern negative to the internal electrode pattern;
        a third step of compression bonding the first support and the second support to each other in such a manner that the conductive layer and the resin layer are opposite to each other; and
        a fourth step of removing the second support from the first support so as to transfer a conductive layer to the second support, the conductive layer having the pattern negative to the internal electrode pattern, thereby forming the internal electrode pattern on the first support;
    a step of forming each of the ceramic sheets on a film, the ceramic sheets containing ceramic powder and a binder;
    a step of forming a laminated body by alternately laminating a plurality of the first supports having the internal electrode patterns thereon and a plurality of the films having the ceramic sheets thereon; and
    a step of sintering the laminated body.

* * * * *